US008488134B2

(12) United States Patent
Reibke

(10) Patent No.: US 8,488,134 B2
(45) Date of Patent: Jul. 16, 2013

(54) MULTIFUNCTION DEVICE FOR PREFABRICATING MARKING LABELS

(75) Inventor: Heinz Reibke, Bad Salzuflen (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 185 days.

(21) Appl. No.: 13/146,960

(22) PCT Filed: Jan. 21, 2010

(86) PCT No.: PCT/EP2010/000342
§ 371 (c)(1), (2), (4) Date: Jul. 29, 2011

(87) PCT Pub. No.: WO2010/086114
PCT Pub. Date: Aug. 5, 2010

(65) Prior Publication Data

US 2011/0279841 A1 Nov. 17, 2011

(30) Foreign Application Priority Data

Jan. 30, 2009 (DE) ......................... 10 2009 006 793

(51) Int. Cl.
*G06K 15/00* (2006.01)
*G07F 11/68* (2006.01)

(52) U.S. Cl.
USPC ........... 358/1.12; 358/1.1; 358/304; 358/305; 156/767; 156/247; 156/542; 156/716; 156/719; 221/22; 221/72; 221/73; 400/586; 400/587; 400/593

(58) Field of Classification Search
USPC ................ 358/1.1, 1.15, 304, 305, 1.12, 1.18
See application file for complete search history.

(56) References Cited

U.S. PATENT DOCUMENTS

| | | | | |
|---|---|---|---|---|
| 4,116,747 | A * | 9/1978 | Hamisch, Jr. | 156/384 |
| 4,194,646 | A * | 3/1980 | Oglander et al. | 221/73 |
| 5,718,525 | A * | 2/1998 | Bruhnke et al. | 400/586 |
| 7,121,313 | B2 * | 10/2006 | Ito | 156/767 |
| 8,118,505 | B2 * | 2/2012 | Hiroike et al. | 400/583 |
| 8,167,017 | B2 * | 5/2012 | Kolp et al. | 156/387 |

FOREIGN PATENT DOCUMENTS

| | | | |
|---|---|---|---|
| DE | 1857546 | U | 8/1962 |
| DE | 8404741 | U1 | 9/1985 |
| DE | 19747663 | A1 | 6/1998 |
| DE | 202004009980 | U1 | 11/2005 |

OTHER PUBLICATIONS

European Patent Office, International Search Report in International Patent Application No. PCT/EP2010/000342 (Apr. 26, 2010).

* cited by examiner

*Primary Examiner* — Dennis Dicker
(74) *Attorney, Agent, or Firm* — Leydig, Voit & Mayer, Ltd.

(57) ABSTRACT

A multifunction device for prefabricating marking labels, having a top side configured to be printed on and a bottom side opposite the top side with a profiling, includes a printing device and at least one of a separating device and a perforation device. A feeder unit is configured to feed blank marking labels of a finite-length or endless material. A holder element including a recess is configured to receive the marking labels, including the profiling, so as to fix the marking labels in position during a passing over of the printing device and the at least one of the separating device and perforation device.

16 Claims, 1 Drawing Sheet

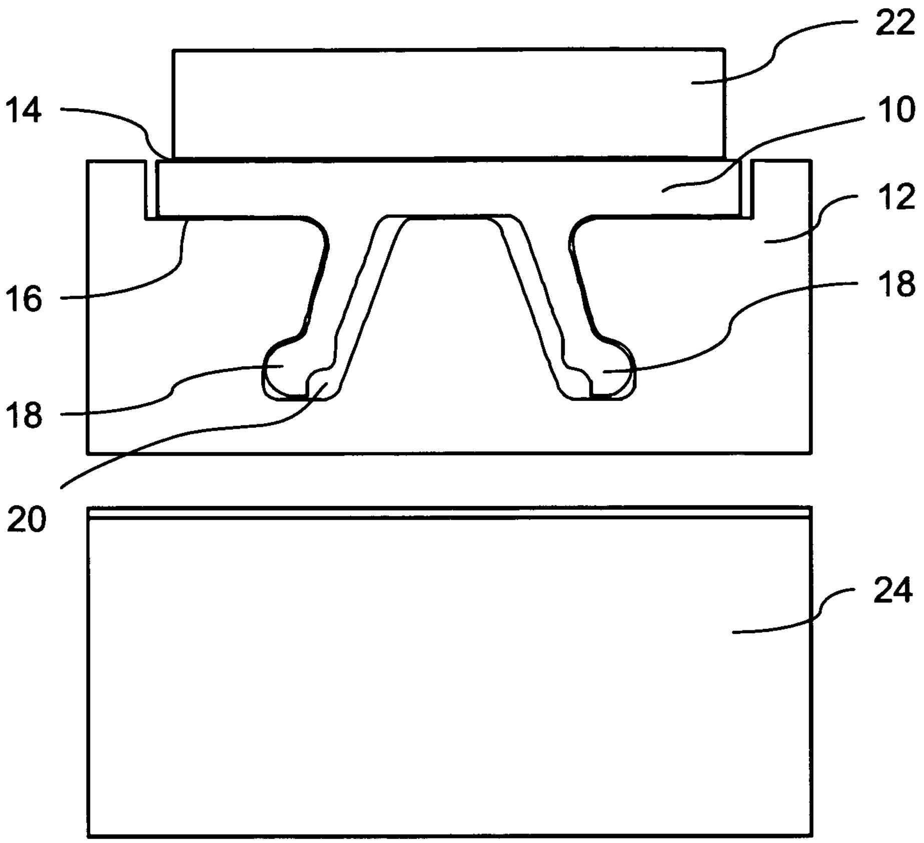
22
14
10
12
16
18
18
20
24

MULTIFUNCTION DEVICE FOR PREFABRICATING MARKING LABELS

CROSS REFERENCE TO RELATED APPLICATIONS

This application is a U.S. National Phase application under 35 U.S.C. §371 of International Application No. PCT/EP2010/000342, filed on Jan. 21, 2010, and claims benefit to German Patent Application No. DE 10 2009 006 793.0, filed on Jan. 30, 2009. The International Application was published in German on Aug. 5, 2010 as WO 2010/086114 A1 under PCT Article 21 (2).

FIELD

The present invention relates to a multifunction device for prefabricating marking labels, in particular marking labels for modular terminal blocks. The present invention also relates to a method for prefabricating marking labels.

BACKGROUND

Marking labels of this kind are typically used for individually labeling, respectively identifying modular terminal blocks, subassemblies and circuit wiring. For labeling purposes, each individual modular terminal block is typically assigned a marking label that is fastenable to the corresponding modular terminal block. The marking label can be a simple identification plate that is inserted into a corresponding marking groove. However, marking labels having legend plates can be provided which, on the bottom side thereof, have a profiling, for example in the form of mounting feet, for snapping into a corresponding marking groove. However, such a profiling complicates the prefabrication, i.e., the suitability of the marking labels for being individually printed on and separated to the desired length and/or perforated, since the profiling often makes it difficult to fix the marking labels in a specific position. This is especially problematic when separating and perforating marking labels having a profiling, since a considerable force must be exerted on the marking labels, so that they can easily slip due to the profiling, leading to an imprecise separation or perforation. In addition, the considerable forces acting during separation or perforation can damage the profiling, making the marking labels unusable as labeling for the modular terminal blocks, for example.

Moreover, in known methods heretofore, it is merely known to execute the printing and the separation of the marking labels in separately configured devices, which results in a complex production process.

SUMMARY

In an embodiment, the present invention provides a multifunction device for prefabricating marking labels having a top side configured to be printed on and a bottom side opposite the top side with a profiling. The multifunction device includes a printing device and at least one of a separating device and a perforation device. A feeder unit is configured to feed blank marking labels of a finite-length or endless material. A holder element including a recess is configured to receive the marking labels, including the profiling, so as to fix the marking labels in position during a passing over of the printing device and the at least one of the separating device and perforation device.

BRIEF DESCRIPTION OF THE DRAWINGS

Exemplary embodiments of the present invention are described in greater detail in the following with reference to the drawing, in which:

FIG. 1 is a schematic sectional view of a multifunction device according to an embodiment of the present invention.

DETAILED DESCRIPTION

In an embodiment, of the present invention provides a multifunction device and a method for prefabricating marking labels, in particular marking labels for modular terminal blocks, whereby the marking labels, including a profiling, are able to be prefabricated simply and precisely in the desired manner without damaging the profiling in the process.

A multifunction device according to an embodiment of the present invention for prefabricating marking labels, in particular marking labels for modular terminal blocks, has a printing device and a separating device and/or a perforation device. In addition, the multifunction device according to the present invention features a feeder unit for blank marking labels of a finite-length or endless material and a holder element in which the marking labels are fixable in position when the printing device and the separating device and/or the perforation device pass over, the marking labels having a top side to be printed on and a bottom side opposite the top side, the bottom side having a profiling. The holder element has a recess in which the marking labels, together with the profiling thereof, are fixable in position when the printing device and the separation device and/or the perforation device pass over.

The multifunction device may be used both to print on marking labels having a profiling on one side, within one device, as well as to separate them to the desired length and/or to perforate them in a subsequent fabrication step. Since a plurality of fabrication steps may be performed within one device, it is possible to substantially reduce the manufacturing outlay for prefabricating a marking label and thus also to simplify the production sequence. In this context, the marking labels, which have not yet been prefabricated, are preferably wound as finite-length or endless material on a roller and are fed by a feeder unit to the individual stations within the multifunction device, i.e., to the printing device, the separation device and/or the perforation device. The marking labels feature a profiling on the bottom side thereof that is formed as two mutually angled mounting feet, for example. To ensure a reliable and precise prefabrication of the marking labels, they are fixed in position during printing and separation and/or perforation in a holder element, the profiling being insertable in a recess provided in the holder element, so that, during prefabrication, the marking labels are held in the desired position, thus making it possible to prevent a slipping or canting of the same. In this manner, straight separation edges may be produced, in particular, even when working with marking labels having a profiling. In addition, since the profiling is configured within the recess, it is protected by the same, so that it is not damaged during prefabrication.

An embodiment of the present invention provides for the recess to be produced as a negative form of the profiling of the marking labels. The negative form allows the profiling to be inserted into the recess with a substantially exact fit, so that the profiling, respectively the marking label has the least possible clearance within the holder element, making it possible to prevent any unintentional movement of the marking label during prefabrication.

To substantially minimize the movement capabilities of the marking element during prefabrication, another embodiment of the present invention provides a positioning element that is placeable on the top side of the marking labels when the separating device and/or the perforation device pass over. The positioning element allows a force to be exerted on the marking labels in a way that prevents the marking labels from being pushed out of the holder element since the force acts on the marking labels during separation and/or perforation of the same. The force applied by the positioning element is at least as great as the forces acting during separation and/or perforation of the marking labels. To be able to apply a uniform force to the marking labels, the positioning element preferably extends over the entire width thereof.

In accordance with another embodiment of the present invention, the separating device has a cutting blade to separate the marking labels to the desired length. Any desired length to be cut may be adjusted. To additionally or alternatively perforate the marking labels, the perforation device features a perforation means.

In an embodiment of the present invention, the cutting blade is guidable during the separation from the bottom side of the marking labels toward the top side thereof, and/or the perforation means is guidable during the perforation from the bottom side of the marking labels toward the top side thereof. Due to this directional movement of the cutting blade and/or of the perforation means, the cutting blade and/or the perforations means may be integrated within the holder element; in a position of non-use, the cutting blade and/or the perforation means being positionable within the region below the recess of the holder element, making possible a most compact possible design of the multifunction device. A directional movement is likewise possible, however, whereby the cutting blade is guided during the separation, respectively the perforation means is guided during the perforation, from the top side of the marking labels toward the bottom side thereof.

In another embodiment of the present invention, the holder element has a guide for guiding the cutting blade during the separation and/or for guiding the perforation means during the perforation. This guide is preferably formed within the holder element as a vertically extending groove that has at least the width of the cutting blade and/or of the perforation means. The guidance makes it possible to provide a very precise separation and/or perforation of the marking labels, whereby it is possible to prevent the cutting blade and/or the perforation means from slipping or turning away.

The marking labels can be manufactured from a plastic material. To prevent, in particular, any breaking of the plastic marking labels during the separation and/or perforation process, an embodiment of the present invention provides that the material of the cutting blade and/or of the perforation means be adapted to the plastic material of the marking labels.

In an embodiment, the present invention also relates to a method for prefabricating marking labels, in particular marking labels for modular terminal blocks, whereby the blank marking labels of a finite-length or endless material are printed and separated and/or perforated in a multifunction device, the marking labels being fixed in position in a holder element during printing and separation and/or perforation, the marking labels having a top side to be printed on and a bottom side opposite the top side, the bottom side having a profiling. In the method, during printing and separation and/or perforation, the marking labels are fixed in position in a recess provided in the holder element. Accordingly, plurality of manufacturing steps for prefabricating marking labels, such as printing, separation and/or perforation, may be performed within one device. In addition, a reliable and precise prefabrication of the marking labels in that the marking labels are fixed in position in a holder element during printing and separation and/or perforation, the profiling being insertable in a recess provided in the holder element, so that, during prefabrication, the marking labels are held in the desired position, and it is thus possible to prevent a slipping or canting of the same. In this manner, it is possible, in particular, also in the case of marking labels having a profiling, to produce straight separation edges. In addition, since the profiling is configured within the recess, it is protected by the same, so that it is not damaged during prefabrication.

In the fixed-in-position state, the profiling of the marking labels advantageously fits substantially precisely in the recess, so that the profiling, respectively the marking label has a small clearance within the holder element, making it possible to prevent any unintentional movement of the marking label during prefabrication. The substantially precise fit of the profiling is preferably achieved in that the recess is produced as a negative form of the profiling.

To prevent the marking labels from slipping during the separation and/or perforation, the marking labels are preferably held in position by a positioning element that is placeable on the top side thereof. The positioning element allows a force to be exerted on the marking labels in a way that prevents them from being pushed out of the holder element by the forces acting on the marking labels during separation and/or perforation of the same. The force applied by the positioning element is at least as great as the forces acting on the marking labels during separation and/or perforation.

In addition, the marking labels can be separated and/or perforated from the bottom side thereof toward the top side thereof.

A multifunction device for prefabricating marking labels 10, in particular marking labels for modular terminal blocks, is illustrated in FIG. 1. The multifunction device has a printing device for inscribing the marking labels and a separating device for separating the marking labels at a desired length and/or a perforation device for perforating the marking labels at a desired length. The still blank marking labels 10 are preferably made of a finite-length or endless material that is wound on a roller and are fed to the multifunction device, in particular the printing device of the multifunction device, by a feeder unit. Within the multifunction device, marking labels 10 are unwound from the roller and are fixed in position in a holder element 12, before being fed to the printing device, the separation device and/or the perforation device.

Marking labels 10 have a top side 14 to be printed on and a bottom side 16 opposite the top side, bottom side 16 having a profiling 18 in the form of two mutually angled mounting feet. To ensure that marking labels 10 are reliably fixed in the desired position during prefabrication, holder element 12 has a recess 20 in which marking labels 10, together with profiling 18 thereof, are fixable in position when the printing device and the separation device and/or the perforation device pass over.

In this context, recess 20 is produced as a negative form of profiling 18 of marking labels 10, whereby marking labels 10 are insertable via profiling 18 thereof into recess 20 with a substantially exact fit, so that profiling 18, respectively marking labels 10 has/have the least possible clearance within the holder element 12, making it possible to prevent any unintentional movement of marking labels 10 during prefabrication.

To prevent a vertical movement of marking labels 10 out of holder element 12 during prefabrication thereof, a positioning element 22 is provided that is placeable on top side 14 of marking labels 10 when marking labels 10 pass the separating device and/or the perforation device. To be able to apply a uniform force to marking labels 10 using positioning element 22, positioning element 22 preferably extends over the entire width thereof.

A cutting blade 24 of a separating device is also shown in FIG. 1. To separate marking labels 10 from bottom side 16 thereof, respectively profiling 18 of marking labels 10, cutting blade 24 may be directed toward top side 14 of marking labels 10. In this context, cutting blade 24 may be integrated within holder element 12; in a position of non-use, cutting blade 24 being positionable within the region below recess 20 of holder element 12, making it possible to provide a most compact possible design of the multifunction device. It is likewise possible, however, for cutting blade 24 to be directed toward bottom side 16 of marking labels 10 to separate marking labels 10 from top side 14 thereof.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

10 marking labels
12 holder element
14 top side
16 bottom side
18 profiling
20 recess
22 positioning element
24 cutting blade

What is claimed is:

1. A multifunction device for prefabricating marking labels having a top side configured to be printed on and a bottom side opposite the top side, the bottom side having a profiling, the device comprising:

a printing device;

at least one of a separating device and a perforation device;

a feeder unit configured to feed blank marking labels of a finite-length or endless material; and a holder element having a recess configured to receive the marking labels, including the profiling, so as to fix the marking labels in position during a passing over of the printing device and the at least one of the separating device and perforation device.

2. The multifunction device recited in claim 1, wherein the marking labels are configured for modular terminal blocks.

3. The multifunctional device recited in claim 1, wherein the recess includes a negative form of the profiling of the marking labels.

4. The multifunction device as recited in claim 1, further comprising a positioning element configured to be disposed on the top side of the marking labels during the passing over of the at least one of the separating device and perforation device.

5. The multifunction device as recited in claim 1, wherein the at least one of the separating device and the perforation device includes the separating device, and the separating device having a cutting blade.

6. The multifunction device as recited in claim 1, wherein the at least one of the separating device and the perforation device includes the perforating device, and the perforating device having a perforator.

7. The multifunction device as recited in claim 5, wherein the cutting blade is configured to be guided during a separation of the marking labels from the bottom side toward the top side of the marking labels.

8. The multifunction device as recited in claim 6, wherein the perforator is configured to be guided during a perforation of the marking labels from the bottom side toward the top side of the marking labels.

9. The multifunction device as recited in claim 5, wherein the holder element includes a guide for guiding the cutting blade during the separation.

10. The multifunction device as recited in claim 6, wherein the holder element includes a guide for guiding the perforator during the perforation.

11. The multifunction device as recited in claim 5, wherein the marking labels include a plastic material, and wherein a material of the cutting blade is adapted to the plastic material.

12. The multifunction device as recited in claim 6, wherein the marking labels include a plastic material, and wherein a material of the perforator is adapted to the plastic material.

13. A method for prefabricating marking labels, the method comprising:

providing blank marking labels of a finite-length or endless material, the marking labels having a top side to be printed on, a bottom side opposite the top side, the bottom side having a profiling;

printing on the marking labels in a multifunction device;

at least one of separating and perforating the marking labels in the multifunction device; and fixing the marking labels in position in a recess in a holder element during the printing and the at least one of separating and perforating.

14. The method as recited in claim 13, wherein the profiling of the fixed marking labels fits substantially precisely in the recess.

15. The method as recited in claim 13, wherein the marking labels are held in position by a positioning element placed on the top side of the marking labels during the at least one of separating and perforating.

16. The method as recited in claim 13, wherein the at least one of separating and perforating is carried out from the bottom side of the marking labels toward the top side of the marking labels.

* * * * *